(12) United States Patent
McCrary

(10) Patent No.: US 6,391,074 B1
(45) Date of Patent: May 21, 2002

(54) GREASE STOPPER

(76) Inventor: James McCrary, P.O. Box 42-2706, Kissimmee, FL (US) 34742

( * ) Notice: Subject to any disclaimer, the term of this patent is extended or adjusted under 35 U.S.C. 154(b) by 0 days.

(21) Appl. No.: 09/779,383

(22) Filed: Feb. 8, 2001

(51) Int. Cl.$^7$ ............................ B01D 35/02; B01D 46/00
(52) U.S. Cl. ................... 55/321; 55/508; 55/DIG. 36; 126/299 R; 454/49
(58) Field of Search ............................ 96/134; 55/320, 55/321, 324, 508, 511, 495, DIG. 31, DIG. 36; 126/299 R, 299 D, 299 E, 300, 301; 454/49

(56) References Cited

U.S. PATENT DOCUMENTS

| | | | | |
|---|---|---|---|---|
| 4,506,665 A | * | 3/1985 | Kuechler | 126/299 D |
| 4,889,543 A | * | 12/1989 | Burt | 55/511 |
| 5,662,097 A | * | 9/1997 | Panos | 126/299 E |
| 6,143,047 A | * | 11/2000 | Jodoin et al. | 55/486 |
| 6,174,340 B1 | * | 1/2001 | Hodge | 44/482 |

* cited by examiner

Primary Examiner—Duane Smith
Assistant Examiner—Frank M. Lawrence
(74) Attorney, Agent, or Firm—Michael I Kroll

(57) ABSTRACT

A grease stopper assembly is provided which captures and contains the effluent discharged from the roof vents of commercial cooking facilities. The assembly includes a plurality of two or four hanger assemblies attached to the vent duct curbing lip. A filter housing, including four independent and interchangeable filter compartments, is received and held by the hanger assemblies such that the assembled filter housing circumvents the duct. The filter housing is reinforced by brackets at the joinder of each combination of filter compartments, and the filter compartments, being pentagonal, are reinforced by brackets at the pentagonal apex. Alternate hanger assemblies are provided which include extension members of various lengths to suspend the filter housing at the desired distance from the roof. The filter compartments contain individually replaceable filter elements, of various combinations, including a porous, ultraviolet light resistant layer, and an impermeable bottom layer of plastic.

20 Claims, 12 Drawing Sheets

GREASE STOPPER

BACKGROUND OF THE INVENTION

1. Field of the Invention

The present invention relates generally to waste management systems and, more specifically, to grease collecting systems for commercial cooking fan exhaust vents. Devices in this particular field prevent damage to the surrounding roof due to the solvent or corrosive action of oily or greasy residue in the vented effluence from commercial cooking facilities. Several devices include a filter element or layers of filter elements that are positioned about the duct of the grease discharge vent.

The filtering elements are typically of one piece, which necessitates the changing of the entire filter when only one small area of it is completely saturated and subject to leakage. This increases the frequency and cost of maintenance. The one-piece filter construction also means that, in case of fire, there will be little possibility of its containment to a small area of the filter. It will most likely involve the entire filter, then possibly the surrounding roof or the venting apparatus, which is typically covered with grease.

The present invention, the Grease Stopper, is a grease filtering and containment system for rooftop protection in commercial cooking applications. It offers a means of grease containment in a configuration that overcomes the deficiencies of the prior art. The present invention provides a suspended compartmentalized system for the containment of grease vented from commercial cooking operations that is quick and easy to install and maintain.

A typical installation involves removal of the fan from the roof duct, which typically includes a rectangular projection on the roof that is used for mounting the exhaust fan. Next, the hanger assembly is installed to the duct with the screws provided. Once the hanger assembly is installed, the filter housing is assembled. The completed filter housing is an octagonal shaped assembly which is suspended about the duct and which consists of identical pentagonal quarter sections or compartments, each with its own filter media, which may be changed independently. These pentagonal frames are constructed of extruded aluminum and fastened around the perimeter with galvanized corner brackets and rivets. The pentagon quarters are fastened to each other by means of one or more fasteners and each seam is covered by a galvanized joiner bracket affixed thereto by fasteners.

2. Description of the Prior Art

There are other devices designed for processing and collecting exhaust effluence of various types. Typical of these is U.S. Pat. No. 4,869,236 issued to John W. Blough Sep. 26, 1989.

Another patent was issued to Dimitri P. Zafiroglu on May 8, 1990 as U.S. Pat. No. 4,923,725. Yet another U.S. Pat. No. 5,196,040 was issued to Patrick A. Malloy et al. on Mar. 23, 1993 and still yet another was issued on Jun. 7, 1994 to Patrick A. Malloy et al. as U.S. Pat. No. 5,318,607.

Another patent was issued to Daryl Mirza et al. on Apr. 30, 1996 as U.S. Pat. No. 5,512,073. Yet another U.S. Pat. No. 5,540,744 was issued to Edward M. Renna on Jul. 30, 1996.

Another was issued to Daryl Mirza et al. on Oct. 22, 1996 as U.S. Pat. No. 5,567,216 and still yet another was issued on Sep. 29, 1998 to Daryl Allen et al. as U.S. Pat. No. 5,814,115. Another patent was issued on Jan. 4, 2000 to Phillip Ackland as U.S. Pat. No. 6,010,558.

U.S. Pat. No. 4,869,236

Inventor: John W. Blough

Issued: Sep. 26, 1989

This invention is an apparatus which collects and stores grease discharged from exhaust fan systems of commercial kitchens. There is a means for collecting the grease which is adjustable so that it can be attached to fit most any size commercial exhaust fan. Once the grease is collected, it flows into a means for storing the grease. The means for storing the grease is releasably supported by means for collecting the grease. Thus, the means for storing the grease can be released, the stored grease removed, and then re-attached to the means for collecting the grease. The invention also includes a means for discharging rain water that is collected by the means for collecting grease. Any water which is collected is discharged into the drainage pipe located on the restaurant roof.

U.S. Pat. No. 4,923,725

Inventor; Dimitri P. Zafiroglu

Issued: May 8, 1990

A disposable article, suitable for absorbing and immobilizing grease generated during cooking, has a housing containing an absorbent bed of particles and polyolefin microfibers.

U.S. Pat. N. 5,196,040

Inventor: Patrick A. Malloy et al.

Issued: Mar. 23, 1993

A grease filter and collection assembly for roof ventilators and the like includes a frame structure having a generally central aperture through which a grease discharge vent projects when the frame structure and trap assembly are installed surrounding the vent, and a replaceable grease-trapping material is removably secured in the frame structure so that the grease-trapping material is exposed within the aperture for trapping grease discharged from the vent. In a preferred embodiment, the frame structure is assembled from extruded frame members, which integrally include a plurality of channels for securing and mounting the assembly for retaining the grease-trapping material within the frame structure. Upper and lower channels accommodate corner connections of the frame members. The frame members have side walls, which peripherally enclose the grease-trapping material that is tucked between the upper and lower channel inwardly extending from the side wall. A preferred grease-trapping material includes a layered composite of grease filtering and trapping materials in which an upper-porous layer for trapping particulate debris is also permeable for passage of liquid grease therethrough into a lower layer which absorbs and retains the grease.

U.S. Pat. No. 5,318,607

Inventor: Patrick A. Malloy

Issued: Jun. 7, 1994

A grease filter and collection assembly for roof ventilators and the like includes a frame structure having a generally central aperture through which a grease discharge vents projects when the frame structure and trap assembly are installed surrounding the vent, and a replaceable grease-trapping material is removably secured in the frame structure so that the grease-trapping material is exposed vent. In a preferred embodiment, the frame structure is assembled from extruded frame members that integrally include a plurality of channels for securing and mounting the assembly for retaining the grease-trapping material within the frame structure. Upper and lower channels accommodate corner connections of the frame members. The frame members have side walls that peripherally enclose the grease-trapping material, which is tucked between the upper and lower channel inwardly extending from the side wall. An additional channel is exteriorly exposed in each of the frame members to enable access to the fasteners and hardware for mounting the collection assembly on a roof or wall through which the vent projects. A preferred grease-trapping material includes a layered composite of grease filtering and trapping materials in which an upper-porous layer for trapping particulate debris is also permeable for passage of liquid grease therethrough into a lower layer which absorbs and retains the grease.

U.S. Pat. No. 5,512,073

Inventor: Daryl Mirza et al.

Issued: Apr. 30, 1996

A grease filter assembly is provided for absorbing airborne grease discharged from a grease discharge vent extending from a roof A support frame is mountable to the duct of the grease discharge vent and grease absorbing pads are supportable upon the support frame in stationary position surrounding the discharge vent and in spaced relation from the roof. The support frame includes support rods mounted adjacent respective sides of the discharge vent duct and extending beyond their respective duct sides to overlap at the corners of the duct and thereby provide a supporting grid including the end portions of each of two rods extending from adjacent walls of the duct. A plurality of grease absorbing pads are supported on the supporting grid disposed adjacent respective sides of the duct. The pads being of sufficient length to extend beyond the duct sides on both ends so that pads disposed at adjacent sides of the duct overlap one another at the corners of the duct. U-shaped retaining clips are slid onto the ends of each of the rods and have a lower aperture through which the retaining clips are slid onto the ends of the rods, with the edges of the overlapping pads being received in the channel of the retaining clips. Tension cords extend between pairs of oppositely disposed retaining clips to retain the pads in engagement with the support frame and to bias the pads into abutment with respective sides of the duct.

U.S. Pat. No. 5,540,744

Inventor: Edward M. Renna

Issued: Jul. 30, 1996

An apparatus for collecting grease from a kitchen ventilator, which is mounted on the roof of a structure housing a restaurant. The apparatus fits around the exhaust fan of a kitchen ventilator and includes at least one layer of filtering medium which fits snugly about the exhaust fan, a rectangular frame for securing the layer of filtering medium about the exhaust fan, and a plurality of retaining bars for securing the layer of filter medium in the rectangular frame. The rectangular frame is comprised of four frame sections joined at each end with 90□ elbows. Each frame section comprises three tubes with supports fitted between the tubes. The 90□ elbows fit over and join the tubes of one frame section with the tubes of another frame section. The retaining bars are positioned between two tubes of opposing frame sections, above the layer of filtering medium. The apparatus includes four retaining bars: a pair of which snugly abut the exhaust fan to prevent any movement of the apparatus relative to the exhaust fan during use; and, each of the remainder of which are positioned between one of the pair and one of the non-opposing frame sections to secure the ends of the layer of filtering medium in the frame. Should parts of a frame section be cut out to accommodate an obstruction, reinforcement supports can be fitted between the tubes of the cut-out frame section and adjacent to the obstruction to reinforce the cut-out frame section. The frame of the apparatus can be expanded in two ways to cover and protect a greater area of the roof from grease expelled from the exhaust fan.

U.S. Pat. No. 5,567,216

Inventor: Daryl Mirza et al.

Issued: Oct. 22, 1996

A grease filter assembly is provided for absorbing grease discharged from a spout of a grease discharge vent extending from a roof. A support frame is mountable to the duct of the grease discharge vent and a grease absorbing pad is supportable upon the support frame in stationary position below the spout and in spaced relation from the roof. The support frame includes support rods mounted adjacent respective sides of the discharge vent duct and can extend beyond their respective duct sides to overlap at two corners of the duct to provide a supporting grid including the end portions of each of two rods extending from two corners of the duct. A grease absorbing pad is supported on the supporting grid disposed adjacent a side of the duct. The pad can be of sufficient length to extend beyond the duct side on both ends. U-shaped retaining clips are slid onto the ends of each of the rods extending normal to the side adjacent the pad and have a lower rod receiving portion through which the retaining clips are slid onto the ends of the rods, with the edge of the pad being received in the channel of the retaining clips. A tension cord extends between each retaining clip and a rod adjacent the side opposite to the side adjacent the pad or to brackets on the corners of the opposite side to retain the pad in engagement with the support frame and to bias the pad into abutment with a side of the duct.

U.S. Pat. No. 5,814,115

Inventor: Darryl Allen et al.

Issued: Sep. 29, 1998

A grease filter system for use in connection with retaining viscous products of combustion in commercial food preparation environments includes a receptacle and a filter element removably supported within the receptacle. The receptacle has a lid covering one end thereof and a bottom. The lid includes an opening through which grease, condensed steam, water and other products of combustion enter the system. The receptacle further includes a plurality of apertures disposed spaced from the bottom about the perimeter of the receptacle such that the filter system retains grease and other viscous fluids while allowing condensed steam, water and other products of combustion to pass through the filter element and the receptacle out through the apertures.

U.S. Pat. No. 6,010,558

Inventor: Phillip Ackland

Issued: Jan. 4, 2000

A rooftop grease containment system for absorbing the high viscosity grease carried by the gaseous effluent generated by cooking food and released through a rooftop exhaust vent, comprising 4–8 mm hydrophobic silica particles contained within porous pads, tubes and pillows placed in different positions in proximity to the rooftop exhaust vent is disclosed.

While these exhaust effluence collectors may be suitable for the purposes for which they were designed, they would not be as suitable for the purposes of the present invention, as hereinafter described.

SUMMARY OF THE PRESENT INVENTION

A primary object of the present invention is to provide an exhaust effluent collector device that overcomes the shortcomings of the prior art devices.

Another object of the present invention is to provide an exhaust effluent collector device that is modular in construction.

Yet another object of the present invention is to provide an exhaust effluent collector device which can be partially disassembled to provide access to the air vent and fan assembly.

Still yet another object of the present invention is to provide an exhaust effluent collector device having individual filter compartments.

Yet another object of the present invention is to provide an exhaust effluent collector device having individual filter compartments having easily and selectively replaceable filter elements contained therein.

Another object of the present invention is to provide an exhaust effluent collector device having compartmentalized filter support elements and filter elements contained therein wherein the framing members act as a firewall between segmented sections.

Additional objects of the present invention will appear as the description proceeds.

The present invention overcomes the shortcomings of the prior art by providing a grease filtering and containment system for rooftop protection in commercial cooking applications. It offers a means of grease containment in a configuration that overcomes the deficiencies of the prior art. The present invention provides a suspended compartmentalized system for the containment of grease vented from commercial cooking operations that is quick and easy to install and maintain.

A plurality of hanger assemblies is attached to the duct by fasteners. Three filter compartments are fixedly attached to one another by means of fasteners forming a U-shaped structure that is slidably attached to the hanger assemblies. A fourth final filter compartment is then attached to the others by fasteners, thereby forming a substantially octagonal shaped assembly that is suspended about the duct.

The completed assembly has four interchangeable, pentagonal shaped filter compartments, each with its own filter media, which may be changed independently. These pentagonal frames are constructed of extruded aluminum and fastened around the perimeter with galvanized corner brackets and rivets. The pentagon quarters are fastened to each other by means of one or more fasteners and each seam is covered by a galvanized joiner bracket affixed thereto by fasteners.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

DETAILED DESCRIPTION OF THE PREFERRED EMBODIMENT

Figure 1:
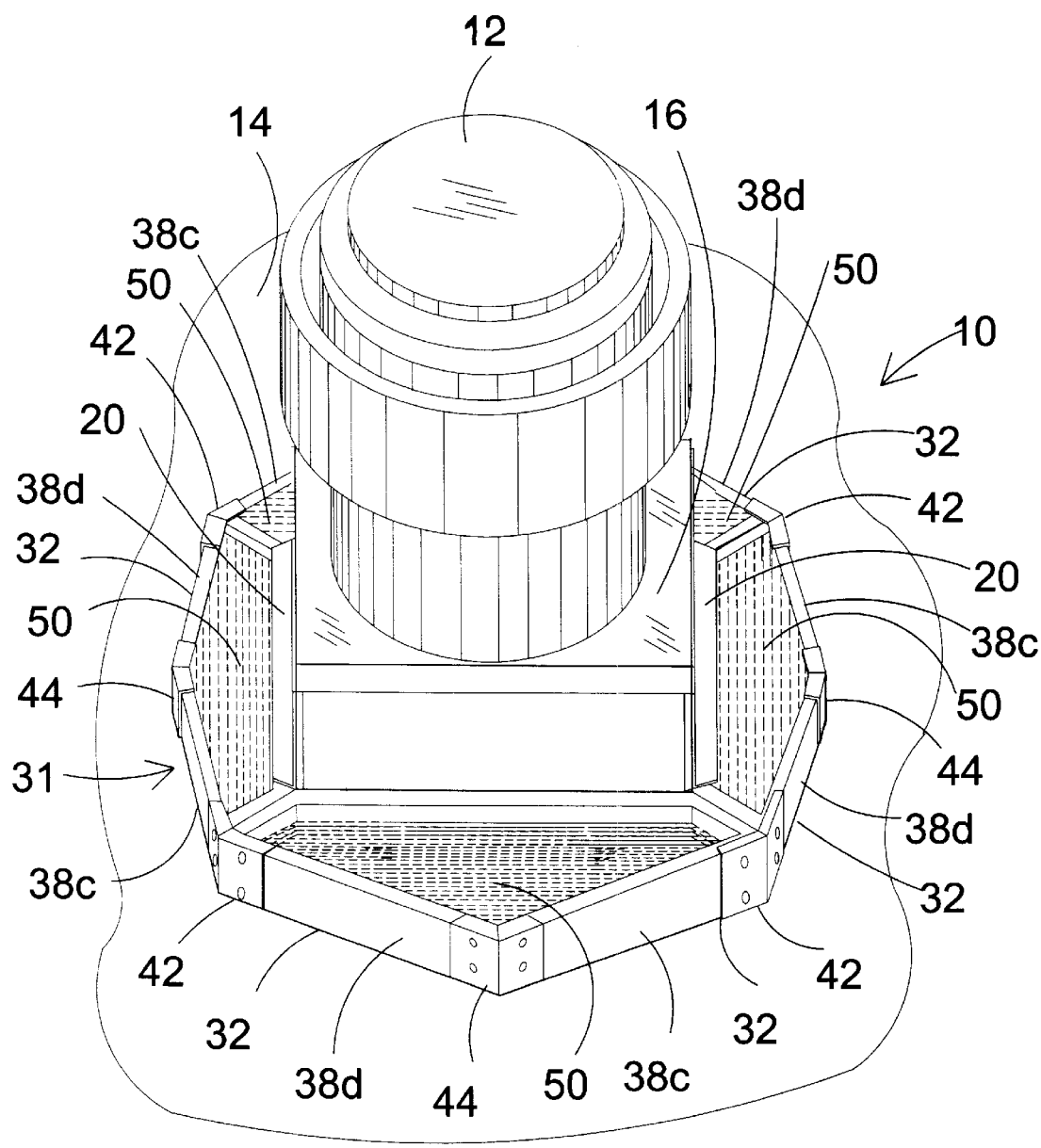
FIG. 1 is a perspective view of the present invention installed on a building's external forced air exhaust vent for the purposes of absorbing grease and other exhaust effluence. Shown is a typical exhaust vent having the exhaust effluence collector device attached thereto.

Turning now descriptively to the drawings, in which similar reference characters denote similar elements throughout the several views, FIGS. 1–12 illustrate the Grease Stopper of the present invention indicated generally by the numeral 10.

Figure 3:
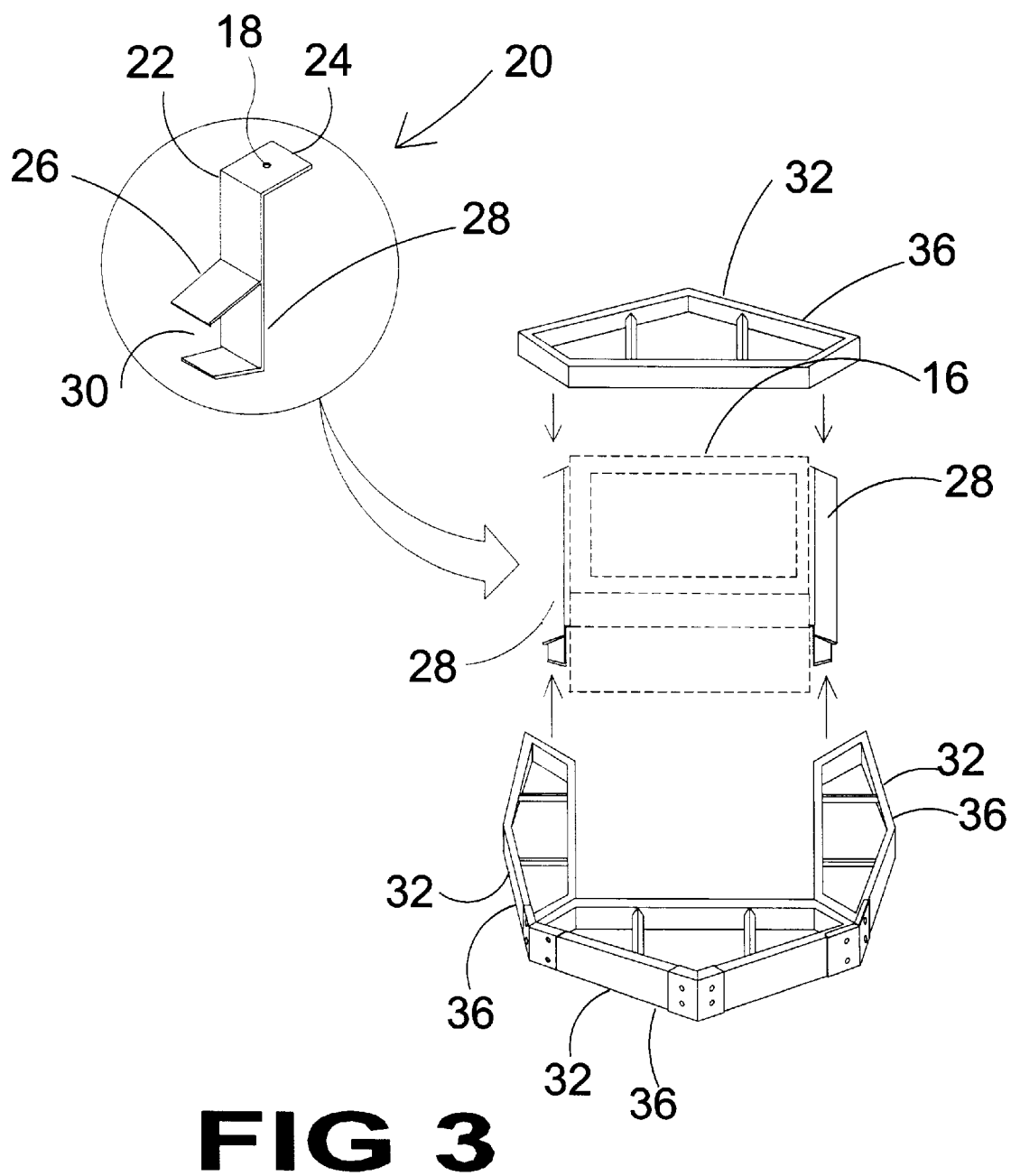
FIG. 3 is a perspective view of the present invention depicting portions of the hanger assembly in position to receive the partially assembled filter housing. The duct is also depicted. The partially assembled filter support member slides into the hanger assembly until the filter compartments are flush with the duct. The fourth filter compartment is then attached to the others, thus completing the installation of the filter housing about the duct. The filter elements are inserted into each of the filter compartments. The advantage of such an assembly is that the exhaust effluent collector device can be partially disassembled to provide access to the air vent and exhaust fan assembly. In addition since each of the filter compartments houses a filter element, selective replacement of filter elements can occur. Also, the frame of each filter compartment acts as a firewall.
Figure 4:
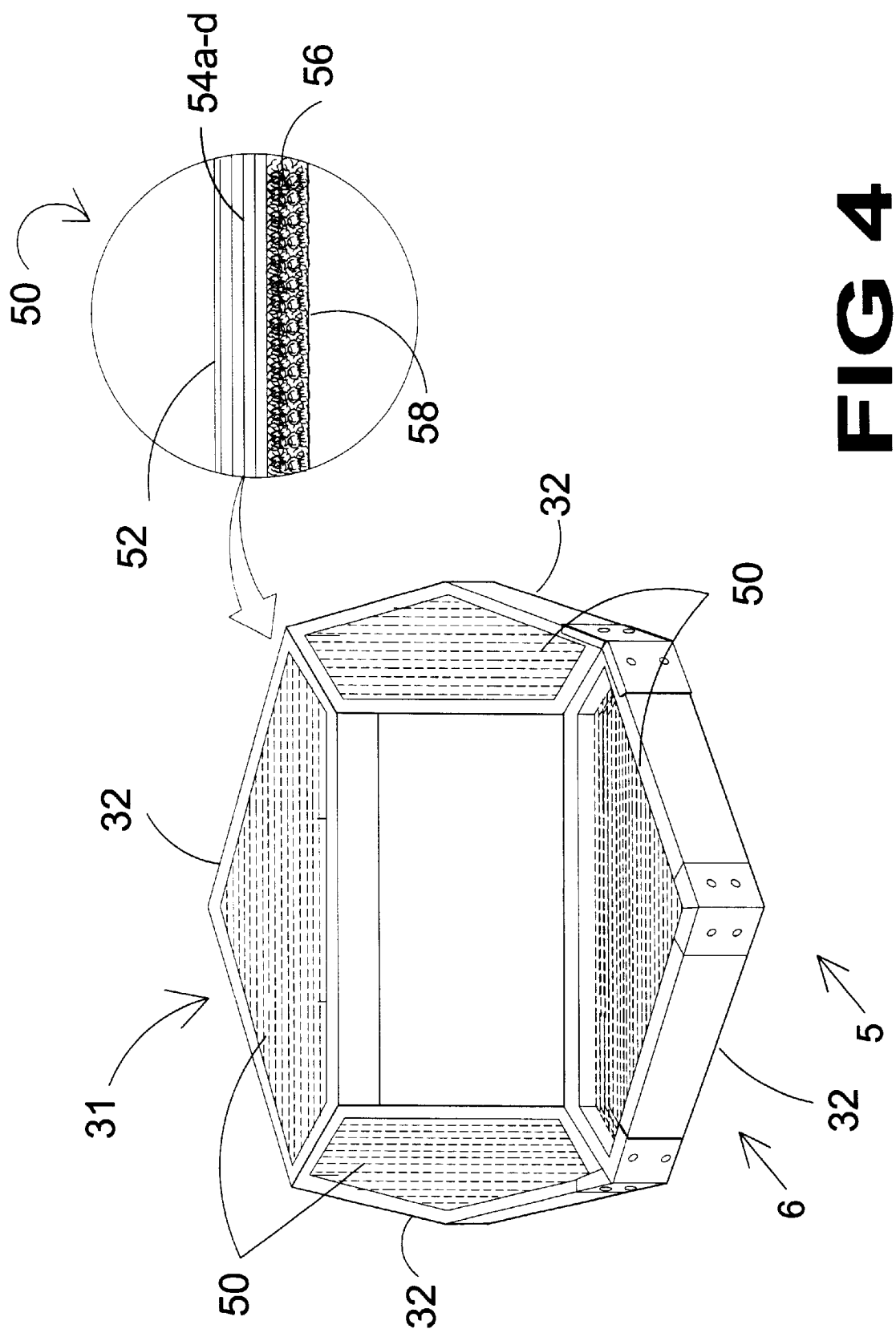
FIG. 4 is a perspective view of the assembled filter housing, including all four filter compartments. Each filter compartment has a filter element system comprised of a porous, ultraviolet light resistant filter layer, a plurality of absorbent filter layers, a breathable filter layer and a fourth plastic filter layer that acts as a seepage barrier.
Figure 8:
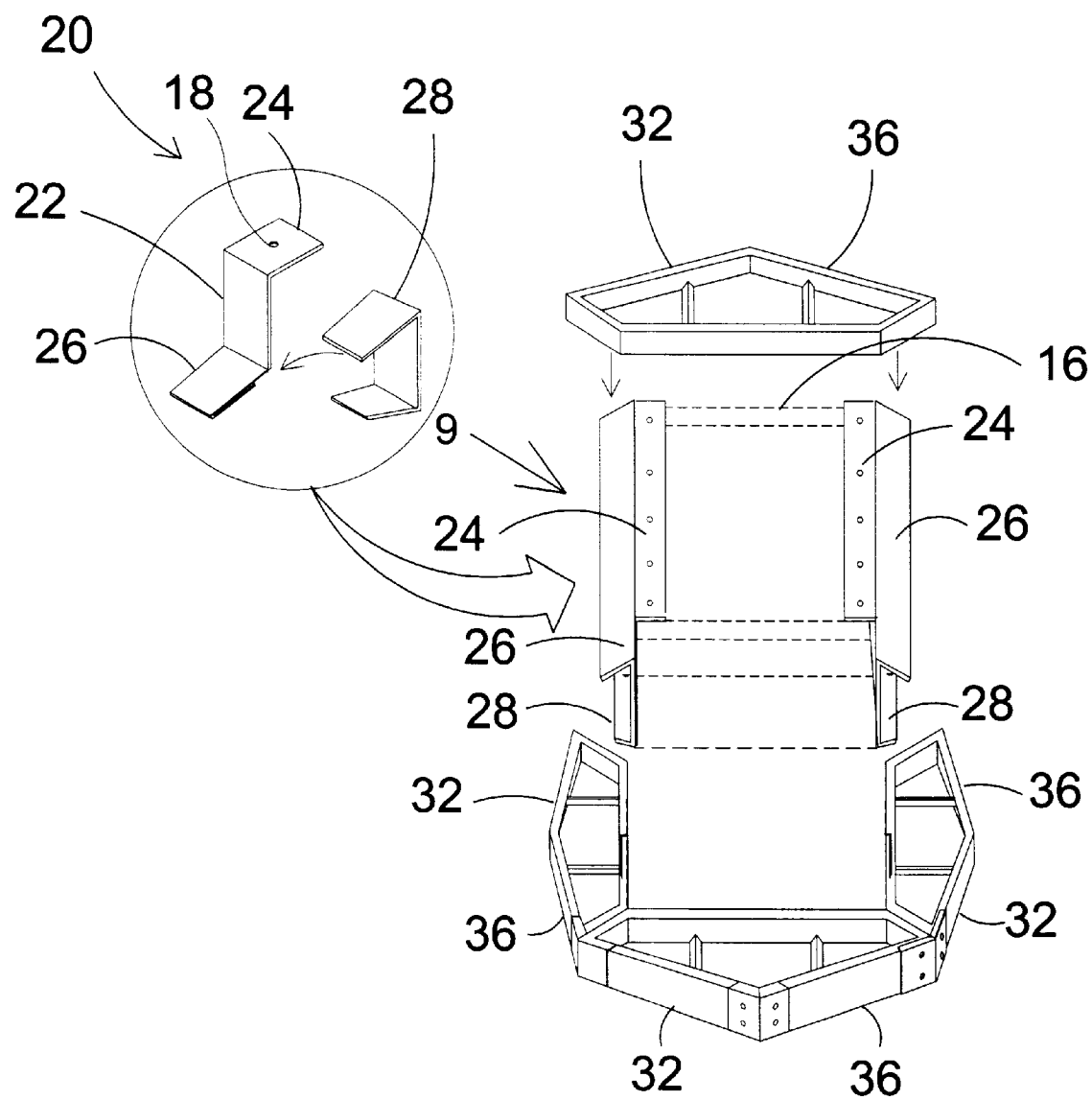
FIG. 8 is a perspective view of the hanger assemblies attached to the duct, with the partially assembled filter housing in position to be slidably positioned on the hanger assembly.
Figure 9:
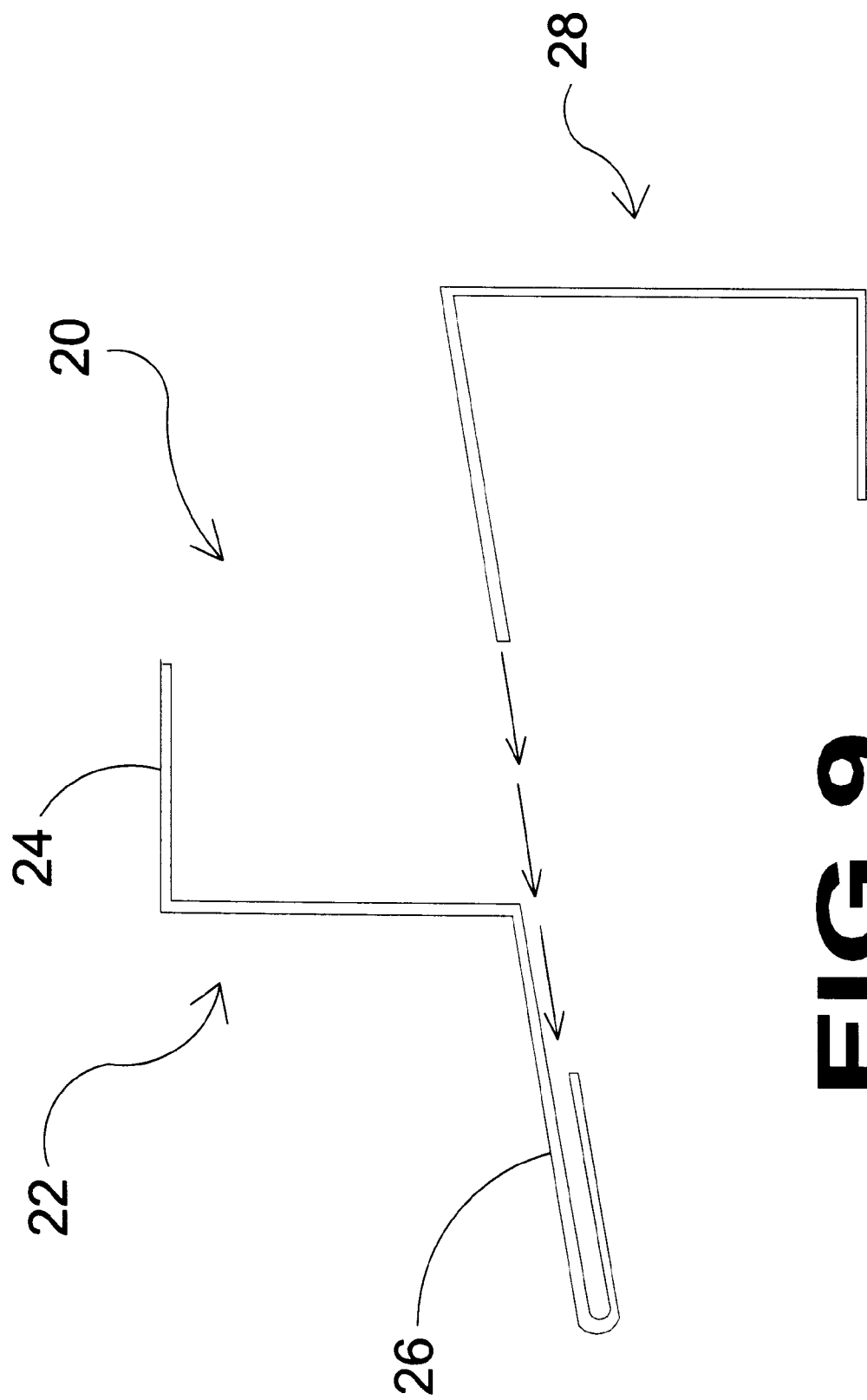
FIG. 9 is a side view of the hanger assembly showing a fold into which the suspended portion of the hanger assembly is inserted.

The grease stopper assembly 10 is shown in FIG. 1. The assembly 10 is combined with a grease discharge vent 12 extending from a roof 14. The assembly 10 is attached to the discharge vent duct 16 by screws (not shown) through openings 18, as shown in FIG. 3 and FIG. 8. Two hanger assemblies 20 are provided, each having an attachment portion 22, including flashing 24 and a fold 26, the fold 26 being shaped to receive a generally channel-shaped suspended portion 28, as depicted in FIG. 3, FIG. 8 and FIG. 9. When assembled the fold 26 and the suspended portion 28 form a channel 30.

Figure 6:
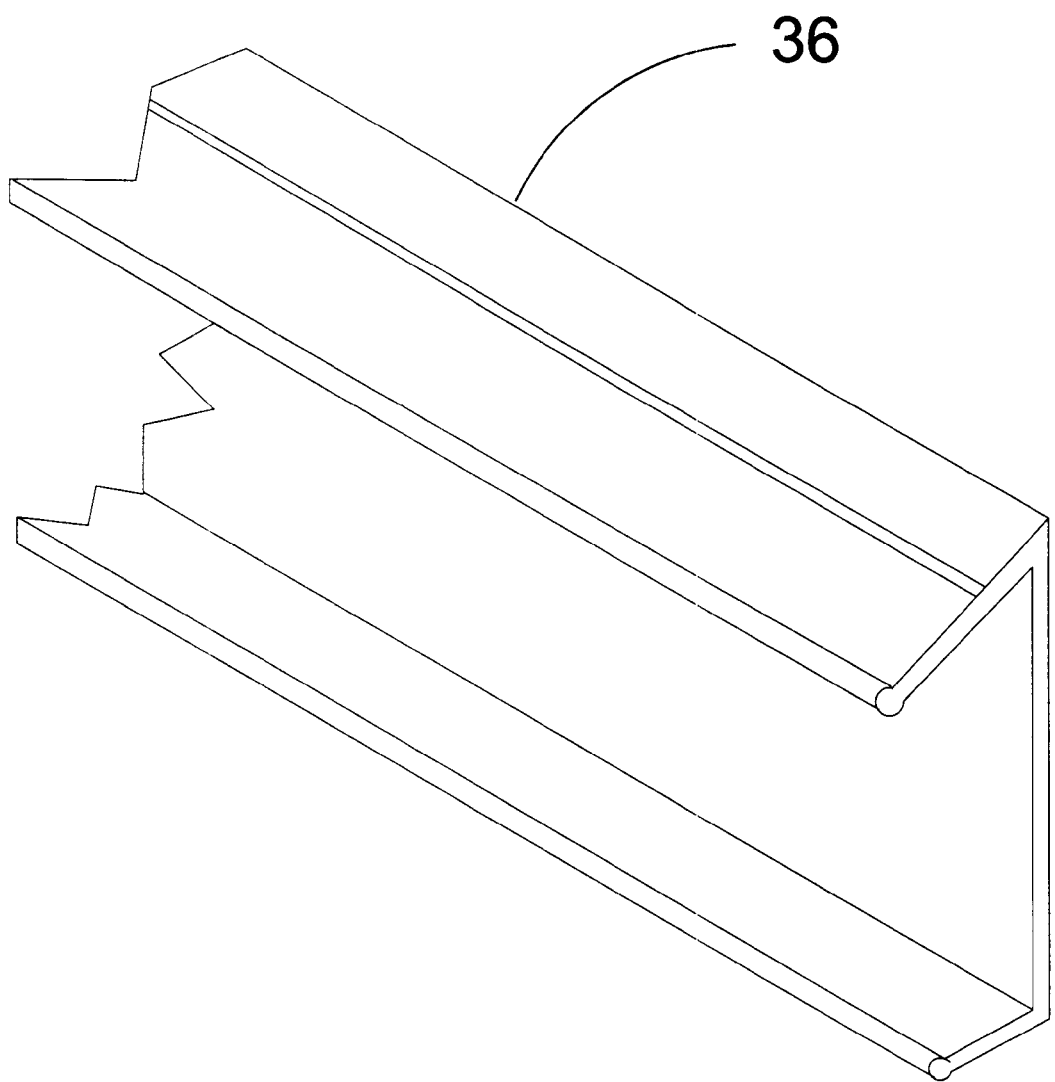
FIG. 6 is a perspective view of a section of the filter compartment frame that is formed in such a fashion as to be slidably insertable into the hanger assembly.

In the preferred embodiment, a housing assembly 31, including four filter compartments 32, is provided, two of the filter compartments 32 being received and held by the hanger assembly channels 30. The remaining two filter compartments 32 are attached to the first two using ordinary fasteners, such as the nut, washer, and bolt combination, 34a, 34b, 34c depicted in FIG. 2. Each filter compartment 32 has a frame 36 having by the channel-shaped sides 38a–e. As shown in FIG. 3 and FIG. 6, the frame side 38a is shaped to be closely received and held by the hanger channel 30. When the attachment of the filter compartments 32 is complete, the filter compartments 32 completely circumvent the duct 16.

Two frame support braces 40 are provided within each filter compartment 32. Each transverses the frame 36, and is positioned at the bottom of the frame 36.

Figure 2:
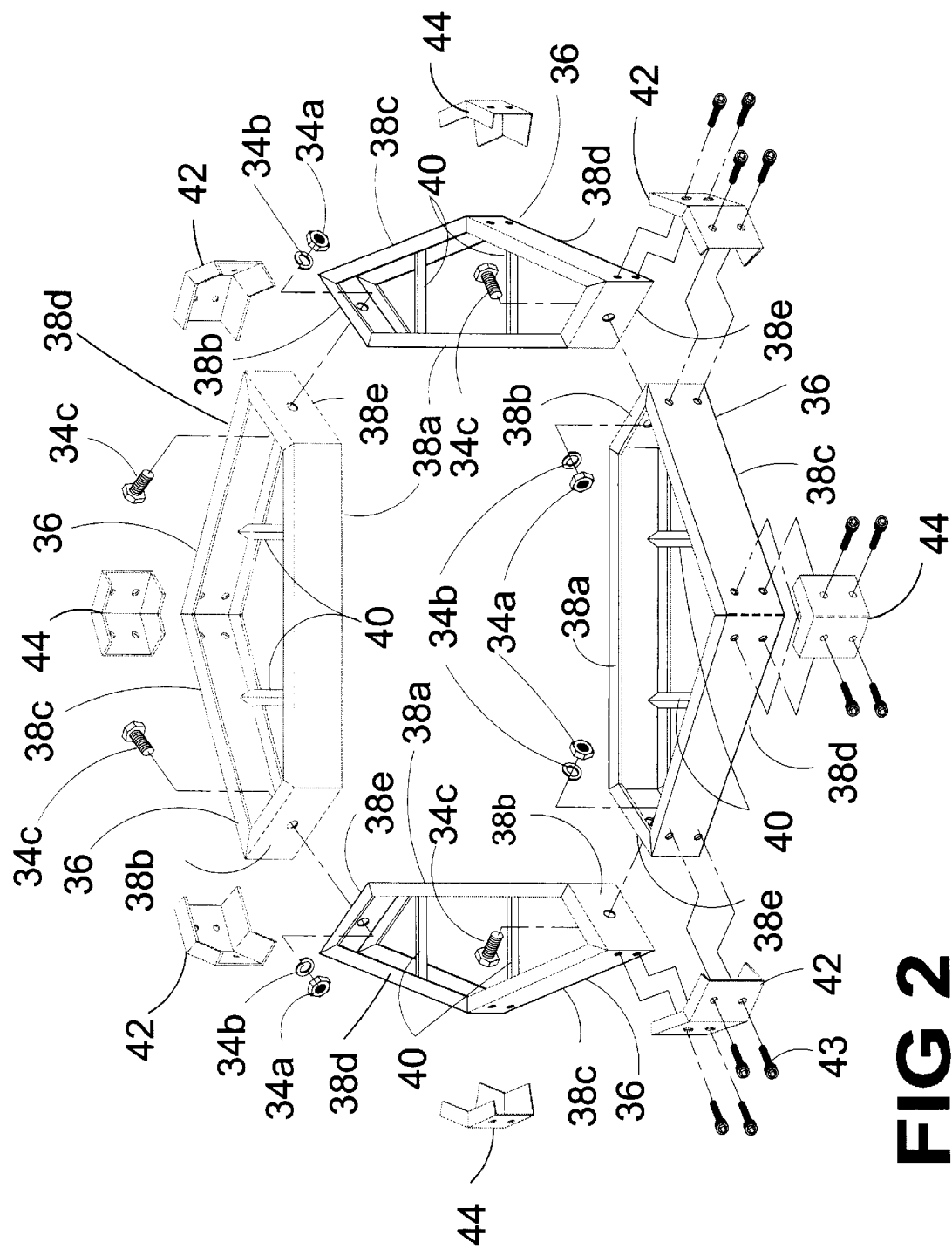
FIG. 2 is an exploded perspective view of the filter housing. The compartmentalized filter housing includes a plurality of filter compartments that are removably affixed to one another by at least one fastener. The filter compartments also have a joiner bracket exteriorly fastened over the filter compartments' joint seam. Each filter compartment is comprised of spaced apart channel frame elements forming a substantially pentagonal frame having a reinforcement bracket exteriorly fastened over the pentagonal apex. Transversely positioned within the spaced apart frame members are structural spacer support elements.
Figure 5:
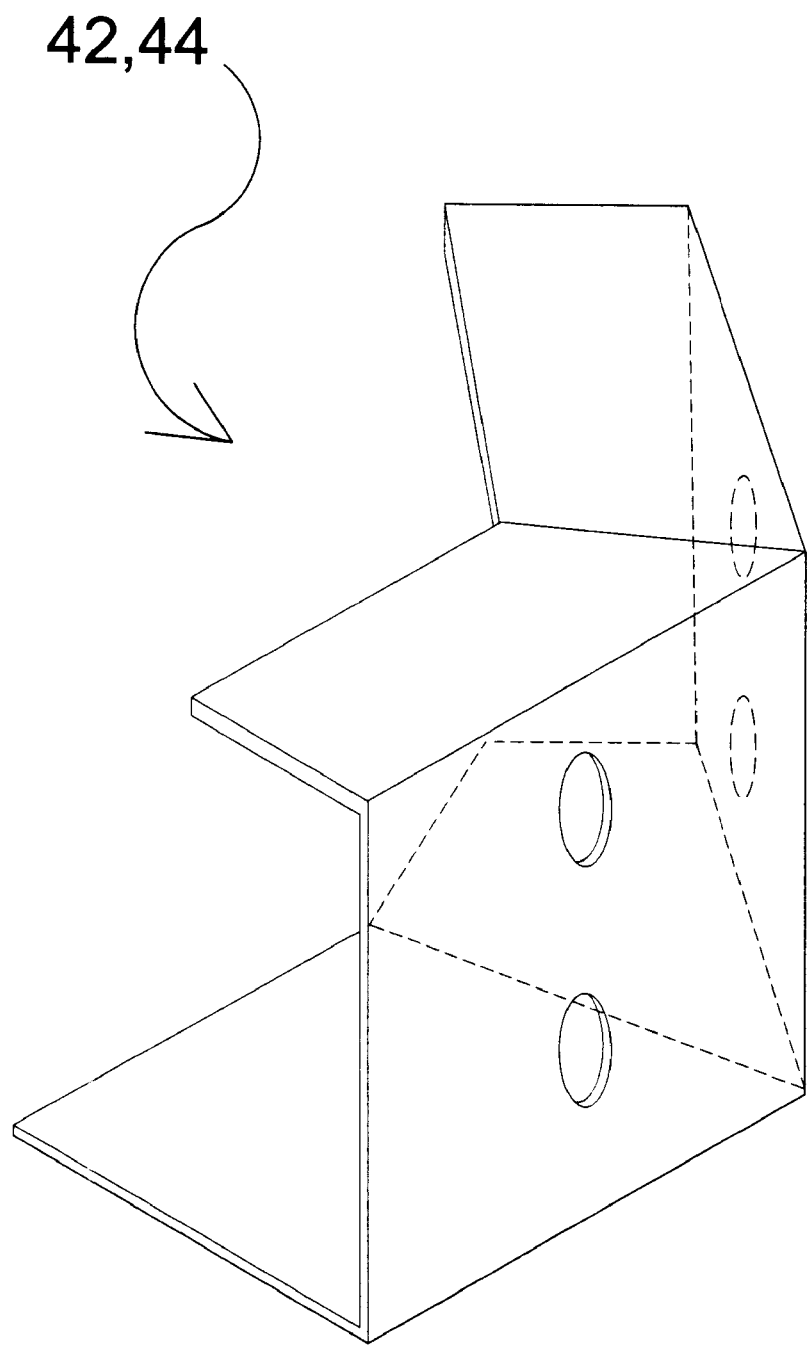
FIG. 5 is a perspective view of the bracket that is used as the reinforcement bracket and the joiner bracket.

The attachment of the filter compartments 32 is strengthened by galvanized joiner brackets 42 which, as particularly shown in FIG. 3 and FIG. 5, are shaped to be flush against one frame side 38c, 38d on each of two adjacent filter compartments 32. The joiner brackets 42 are attached to the frame sides 38c, 38d using ordinary fasteners such as rivets 43, as shown in FIG. 2.

Frame 36 integrity is also strengthened by galvanized reinforcement brackets 44 attached proximate the joinder of two exterior frame sides 38c, 38d on each filter compartment 32. Ordinary fasteners are used, such as rivets 43. The reinforcement brackets 44 and joiner brackets 42 are identical.

Figure 7:
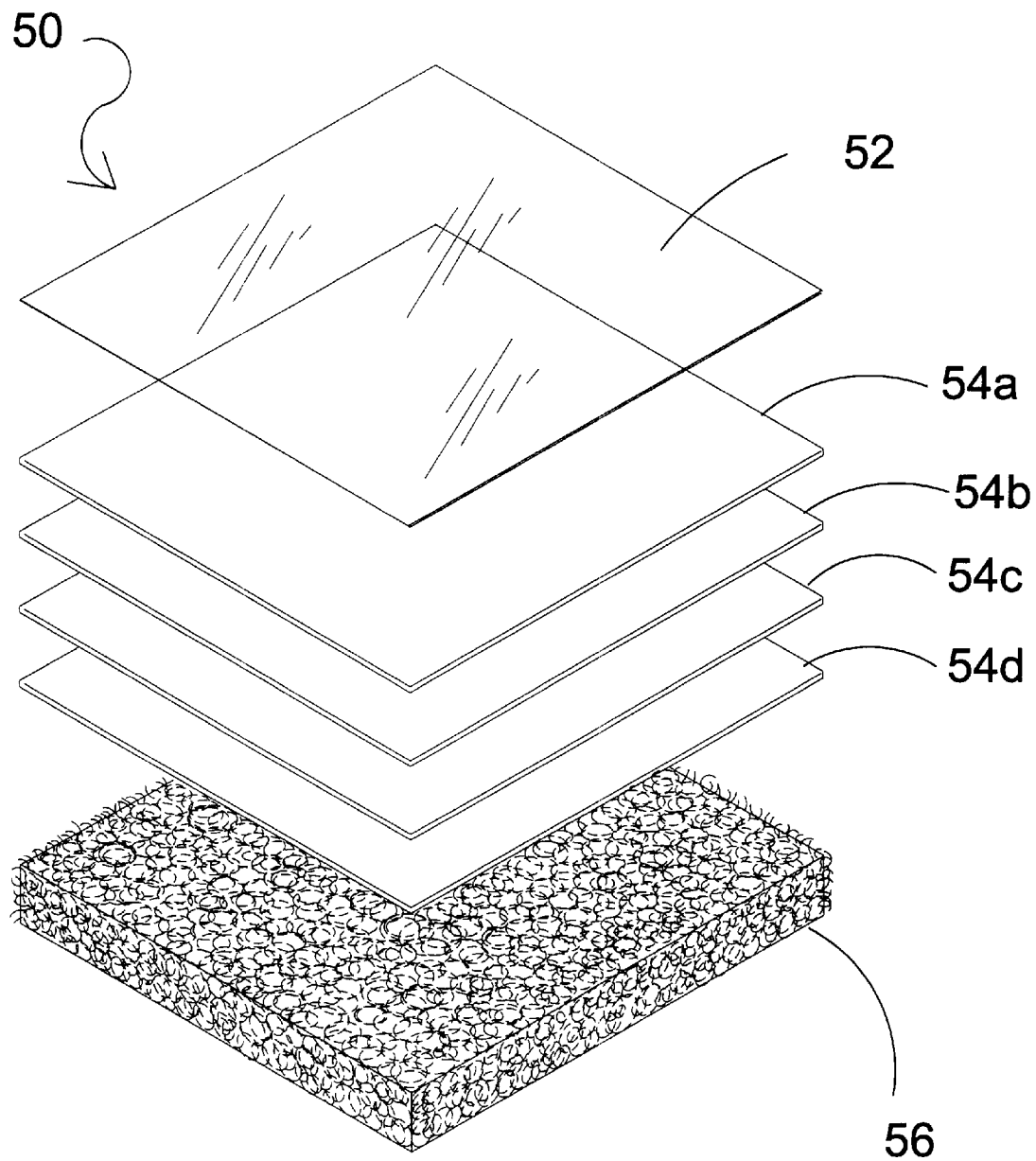
FIG. 7 is a perspective view of one possible embodiment of the filter elements comprising a porous, ultraviolet light resistant filter layer, a plurality of absorbent filter layers, and a final breathable filter layer.

Positioned within each filter compartment 32, and held by frame sides 38a–e, is a filter element 50. Each filter element 50 is also supported by the frame support braces 40. The positioning of the filter compartments 32 about the duct 16 causes substantially all of the grease discharge to fall upon one of the filter elements 50. In the preferred embodiment, and as shown in FIG. 7, a porous layer of material is used for the top layer 52 and is resistant to ultraviolet light. Beneath this layer 52 are four layers of grease absorbing materials 54a–d, then a breathable layer 56. In another embodiment, an impermeable layer of plastic 58 is added as a bottom layer.

In other embodiments, other materials, combinations of materials, and configurations of materials can be utilized for the filter element 50. The additional types of filter element materials that can be utilized are widely known in the art and have been extensively discussed in patents such as U.S. Pat. No. 5,512,073, by Mirza et al. and U.S. Pat. No. 5,196,040 by Malloy et al. These two patents are incorporated herein by reference.

Figure 10:
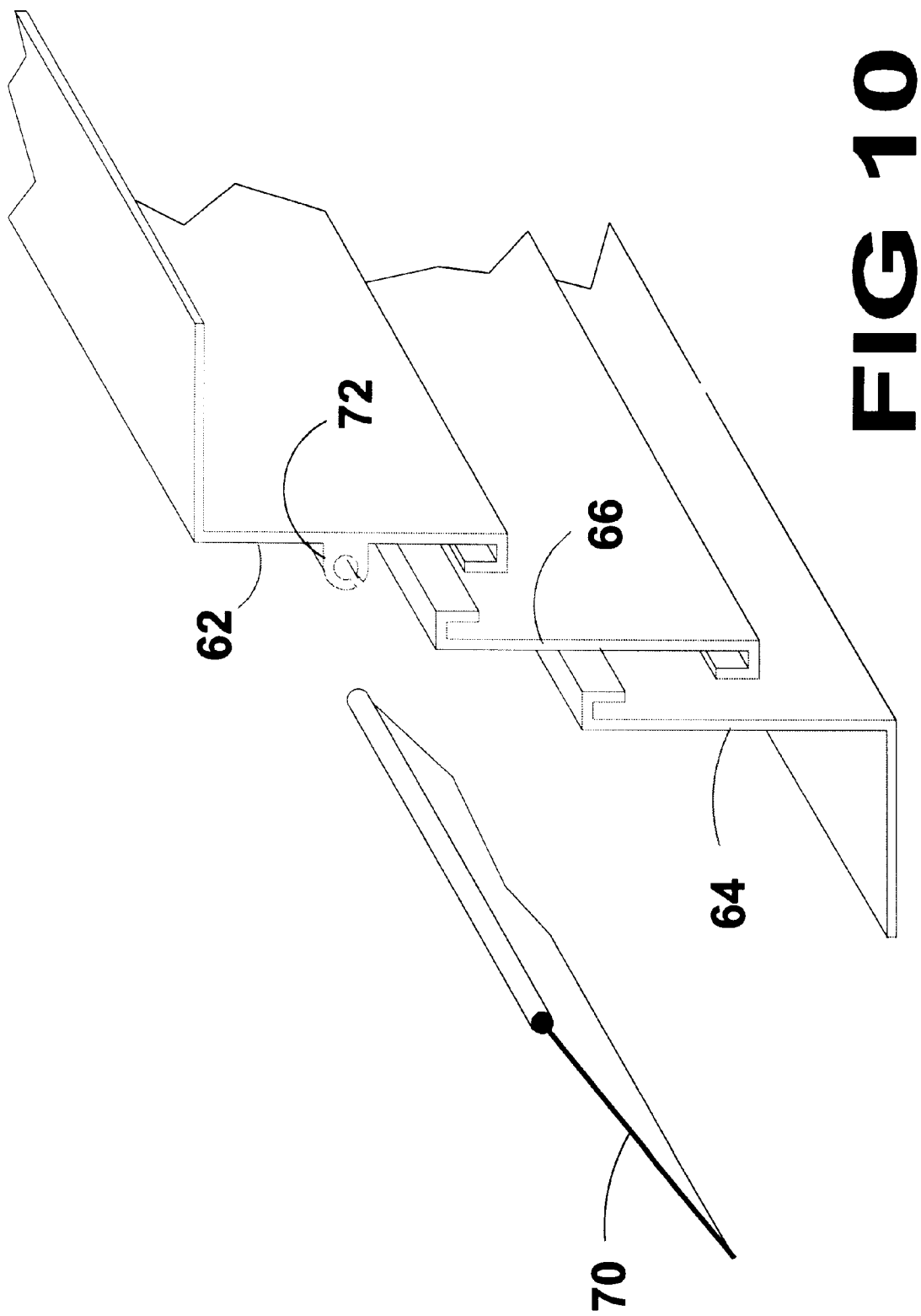
FIG. 10 is a perspective view depicting another type of hanger assembly comprising an attachment portion, an extension member, and a suspended portion by which the filter compartment is supported. The attachment portion has a slotted portion forming a channel through which a diverter panel can be slidably attached. In this view the components are separated.
Figure 11:
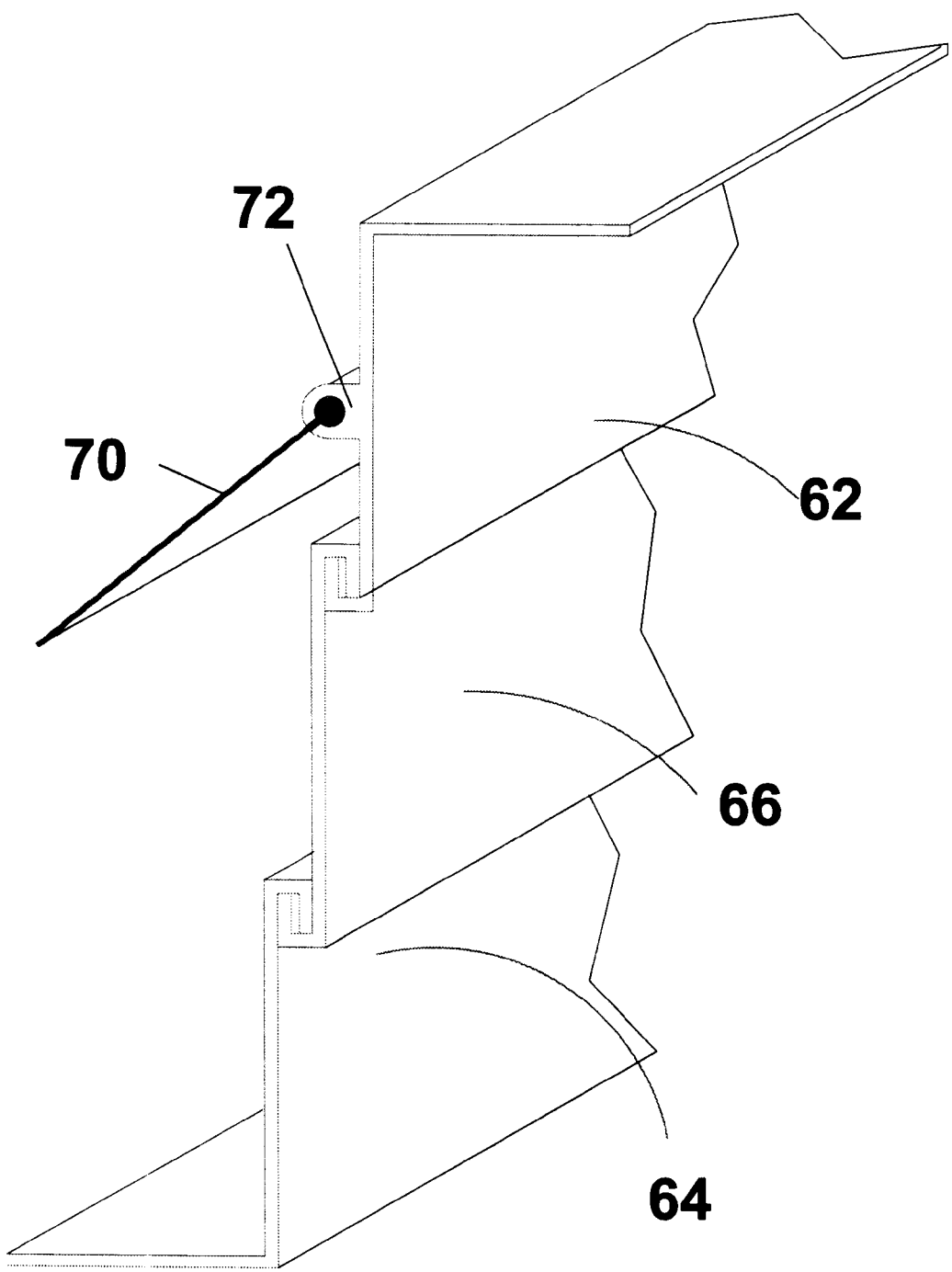
FIG. 11 is a perspective view of the alternate hanger assembly shown in FIG. 10. In this view the components are assembled

FIGS. 10 and 11 depict an alternate hanger assembly 60 in which an attachment portion 62 attaches to the duct 16, and a suspended portion 64 receives and supports the filter compartment 32. An optional extension member 66, of various suitable lengths is also provided, and can be inserted between the top portion 62 and the bottom portion 64 to vary the height of the filter compartments 32 with respect to the roof 14. By using this alternate hanger assembly 60, or by originally sizing the above-described hanger assembly 20, the filter compartments 32 can be positioned substantially flush to the roof 14, or elevated above the same.

Figure 12:
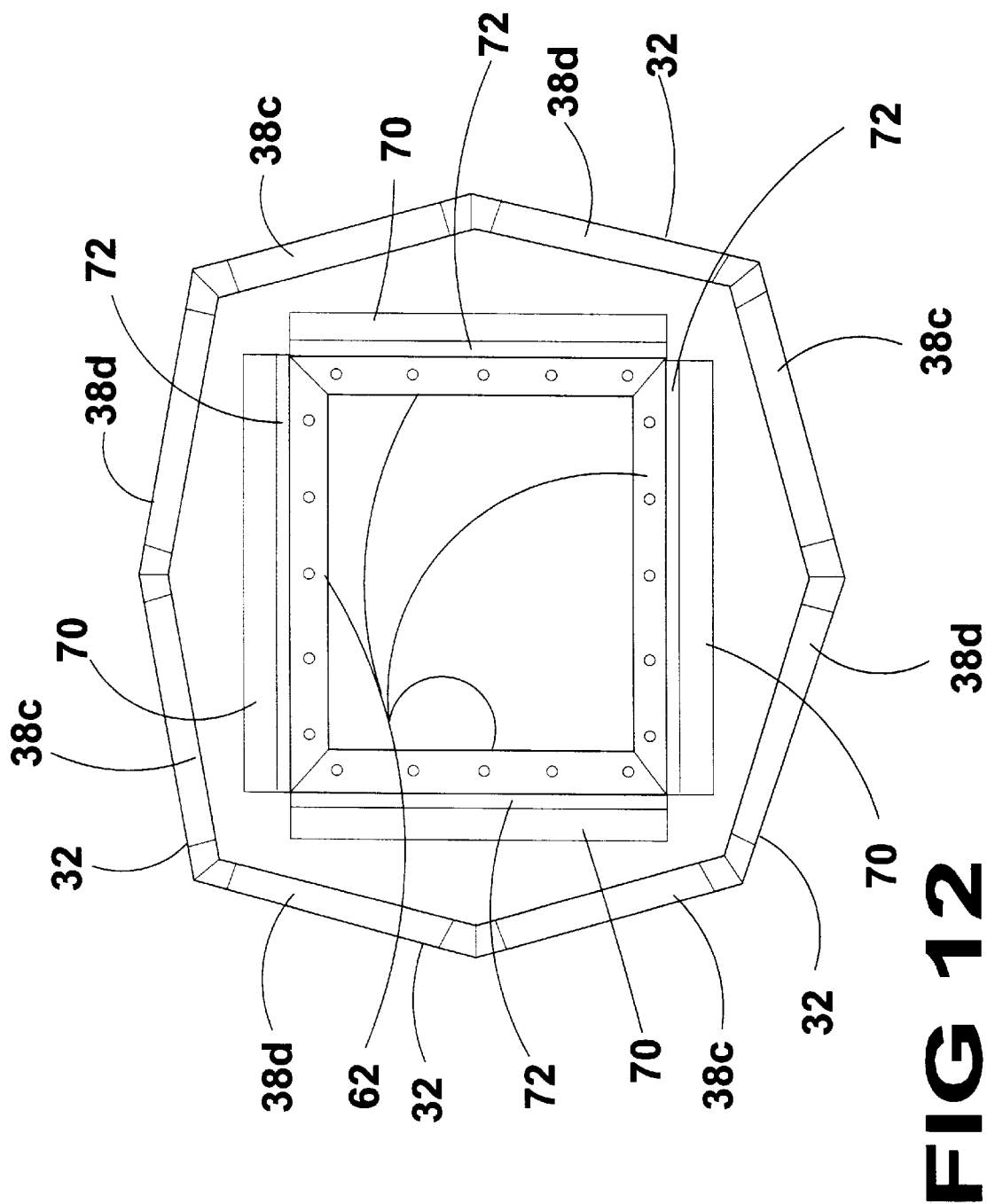
FIG. 12 is a top view of an alternate embodiment including four hanger assemblies, with the diverter panel installed.

Also shown in FIG. 10, FIG. 11, and FIG. 12, is a diverter panel 70 and a diverter channel 72 positioned on the alternate hanger assembly top portion 62. When the diverter panel 70 is positioned within the diverter channel 72 the discharged grease will be displaced onto the filter elements 50 at a farther distance from the duct 16. The diverter panel 70 and diverter channel 72 can also be positioned on the hanger assembly attachment portion 22 of the preferred embodiment, for the same purpose.

FIG. 12 also depicts another embodiment wherein four hanger assemblies 20 are utilized, each such hanger assembly 20 receiving and holding a filter compartment 32.

In other embodiments (not shown), the filter compartment frames include an arcuate outer edge, the outer edges forming a generally circular perimeter when the filter compartments are joined.

The filter compartment frames 36, hanger assemblies 20, 60, joiner brackets 42, and reinforcement brackets 44, can be made from any number of materials, including tin, steel, aluminum, and various plastics, all in accordance with the present invention, and as determined by the intended end use for the overall assembly, as will occur to those of skill in the art upon review of the present disclosure.

It will be understood that each of the elements described above, or two or more together may also find a useful application in other applications differing from that described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A grease filter assembly for absorbing grease and other effluence from a grease discharge vent having a duct extending from a roof, the assembly comprising:
    (a) a plurality of filter compartments supported by said duct above said roof;
    (b) a filter element held and disposed within each of the filter compartments so that substantially all of the grease discharge from said duct will fall upon a filter element; and
    (c) a plurality of hangers positioned on and around said duct to closely receive and position the filter compartments proximate the duct.

2. The assembly of claim 1, wherein each filter compartment further comprises a frame, the frame having an inwardly facing channel, the filter element being positioned within the frame such that the channel retains the filter element within the frame.

3. The assembly of claim 2, wherein each filter compartment further comprises a support brace, the support brace generally transversing the filter compartment frame.

4. The assembly of claim 3, wherein the support brace is positioned within the frame such that the filter element is supported by the support brace.

5. The assembly of claim 2, wherein the number of filter compartments is four and each filter compartment frame further comprises five sides.

6. The assembly of claim 5, further comprising a plurality of reinforcement brackets, each reinforcement bracket being attached to two adjacent frame sides.

7. The assembly of claim 2, further comprising a plurality of joiner brackets, each joiner bracket joining two filter compartment frames.

8. The assembly of claim 1, further comprising a joiner member, the joiner member joining two filter compartments.

9. The assembly of claim 1, wherein the number of filter compartments is four, the filter compartments being positionable on the hangers such that the duct is substantially surrounded by the filter compartments.

10. The assembly of claim 9, wherein the number of hangers is four.

11. The assembly of claim 9, wherein the number of hangers is two and each filter compartment is attached to an adjacent filter compartment.

12. The assembly of claim 11, wherein each filter compartment contains a selectively replaceable filter element.

13. The assembly of claim 1, wherein each filter compartment is attached to an adjacent filter compartment.

14. The assembly of claim 1, wherein the filter compartments are independently removable and a firewall between compartments.

15. The assembly of claim 1, wherein the filter element further comprises:
    (a) a top layer, porous to grease and water, which blocks all or some ultraviolet light; and
    (b) one or more inner layers which absorb grease.

16. A grease filter assembly for absorbing grease and other effluence from a grease discharge vent having a duct extending from a roof, the assembly comprising:
    (a) a plurality of filter compartments;
    (b) a filter element held within each of the filter compartments;
    (c) a plurality of hangers positioned to closely receive and position the filter compartments proximate the duct; and
    (d) each hanger further comprising:
        (i) an attachment portion, the attachment portion being attached to the duct, the attachment portion having a bottom end; and
        (ii) a suspended portion, the suspended portion having a top end, the top end being closely received and held by the attachment portion bottom end, the mated attachment portion bottom end and suspended portion top end defining a filter compartment reception channel, the filter compartment reception channel being adapted to closely receive and hold one of the filter compartments.

17. A grease filter assembly for absorbing grease and other effluence from a grease discharge vent having a duct extending from a roof, the assembly comprising:
    (a) a plurality of filter compartments;
    (b) a filter element held within each of the filter compartments;
    (c) a plurality of hangers positioned to closely receive and position the filter compartments proximate the duct; and
    (d) each hanger further comprising:
        (i) an attachment portion, the attachment portion being attached to the duct, the attachment portion having a bottom end;
        (ii) a suspended portion, the suspended portion having a top end, the top end being closely received and held by an extension member bottom end, the suspended portion further having a bottom end, the suspended portion bottom end being shaped to support one of the filter compartments; and
        (iii) said extension member having a top end, the extension member top end being adapted to be closely received and held by the attachment portion bottom end, the extension member further having a bottom end, the extension member bottom end being adapted to closely receive and hold the suspended portion top end, such that the extension member connects the attachment portion to the suspended portion.

18. A grease filter assembly for absorbing grease and other effluence from a grease discharge vent having a duct extending from a roof, the assembly comprising:
    (a) a plurality of filter compartments;
    (b) a filter element held within each of the filter compartments;
    (c) a plurality of hangers positioned to closely receive and position the filter compartments proximate the duct;
    (d) a diverter member; and
    (e) each of the hangers having a diverter reception portion, and a diverter member secured to the diverter reception portion in a manner that falling grease is diverted farther from the duct.

19. A grease filter assembly for absorbing grease and other effluence from a grease discharge vent having a duct extending from a roof, the assembly comprising:
    (a) a plurality of filter compartments;
    (b) a filter element held within each of the filter compartments;
    (c) a plurality of hangers positioned to closely receive and position the filter compartments proximate the duct; and (d) the filter element further comprises a top layer, porous to grease and water, which blocks all or some ultraviolet light, an impermeable bottom layer, and one or more inner layers which absorb grease.

20. The assembly of claim 19, wherein the impermeable bottom layer is plastic.

* * * * *